United States Patent
Luetkens, Jr. et al.

(10) Patent No.: US 8,889,932 B2
(45) Date of Patent: Nov. 18, 2014

(54) METHODS OF PRODUCING JET FUEL FROM NATURAL OIL FEEDSTOCKS THROUGH OXYGEN-CLEAVED REACTIONS

(75) Inventors: Melvin L. Luetkens, Jr., Batavia, IL (US); Steven A. Cohen, Naperville, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 517 days.

(21) Appl. No.: 13/129,172

(22) PCT Filed: Nov. 25, 2009

(86) PCT No.: PCT/US2009/065858
§ 371 (c)(1),
(2), (4) Date: May 13, 2011

(87) PCT Pub. No.: WO2010/062932
PCT Pub. Date: Jun. 3, 2010

(65) Prior Publication Data
US 2011/0230687 A1  Sep. 22, 2011

Related U.S. Application Data

(60) Provisional application No. 61/118,344, filed on Nov. 26, 2008.

(51) Int. Cl.
| | | |
|---|---|---|
| C10G 3/00 | (2006.01) | |
| C10G 67/12 | (2006.01) | |
| C10G 65/08 | (2006.01) | |
| C10G 27/14 | (2006.01) | |
| C10L 1/06 | (2006.01) | |
| C10G 27/04 | (2006.01) | |
| C10G 65/04 | (2006.01) | |
| C10L 1/04 | (2006.01) | |

(52) U.S. Cl.
CPC ............ *C10G 67/12* (2013.01); *C10G 65/08* (2013.01); C10G 2300/30 (2013.01); *C10G 27/14* (2013.01); *C10L 1/06* (2013.01); C10G 2300/1011 (2013.01); *C10G 3/50* (2013.01); *C10G 27/04* (2013.01); C10G 2300/1014 (2013.01); *C10G 65/043* (2013.01); C10G 2300/1018 (2013.01); C10G 2400/08 (2013.01); *C10G 3/00* (2013.01); *C10L 1/04* (2013.01)
USPC ........... 585/240; 585/331; 585/734; 585/752; 208/49

(58) Field of Classification Search
CPC ............ C10G 3/00; C10G 3/50; C10G 27/04; C10G 27/14; C10G 67/12
USPC .............. 208/69, 106, 49; 585/240, 331, 734, 585/752
See application file for complete search history.

(56) References Cited

U.S. PATENT DOCUMENTS

| | | |
|---|---|---|
| 4,943,396 A | 7/1990 | Johnson |
| 4,992,605 A | 2/1991 | Craig et al. |

(Continued)

FOREIGN PATENT DOCUMENTS

| | | |
|---|---|---|
| EP | 1 728 844 A1 | 12/2006 |
| JP | 05-004938 A | 1/1993 |

(Continued)

OTHER PUBLICATIONS

Aviation Fuels and Fuel Tanks, Oct. 2004, pp. 1-4. Obtained from www.fire.tc.faa.gov/pdf/TG67.pdf.*

(Continued)

*Primary Examiner* — Renee E Robinson
(74) *Attorney, Agent, or Firm* — Brinks Gilson & Lione

(57) ABSTRACT

Methods are provided for producing a jet fuel composition from a feedstock comprising a natural oil. The methods comprise reacting the feedstock with oxygen under conditions sufficient to form an oxygen-cleaved product. The methods further comprise hydrogenating the oxygen-cleaved product under conditions sufficient to form a jet fuel composition.

14 Claims, 2 Drawing Sheets

(56) References Cited

U.S. PATENT DOCUMENTS

| | | |
|---|---|---|
| 5,043,485 A | 8/1991 | Fleckenstein et al. |
| 5,091,116 A | 2/1992 | Krishnamurthy et al. |
| 5,113,030 A | 5/1992 | Chen et al. |
| 5,146,033 A | 9/1992 | Schrock et al. |
| 5,191,145 A | 3/1993 | Allen et al. |
| 5,262,076 A | 11/1993 | Ishida et al. |
| 5,264,606 A | 11/1993 | Moloy et al. |
| 5,298,271 A | 3/1994 | Takashina et al. |
| 5,342,909 A | 8/1994 | Grubbs et al. |
| 5,348,755 A | 9/1994 | Roy |
| 5,374,751 A | 12/1994 | Cheng et al. |
| 5,391,385 A | 2/1995 | Seybold |
| 5,401,866 A | 3/1995 | Cheng et al. |
| 5,414,184 A | 5/1995 | Wu et al. |
| 5,432,083 A | 7/1995 | Copeland et al. |
| 5,484,201 A | 1/1996 | Goolsbee |
| 5,532,163 A | 7/1996 | Yagi et al. |
| 5,560,950 A | 10/1996 | Conte et al. |
| 5,596,111 A | 1/1997 | Sibi et al. |
| 5,597,600 A | 1/1997 | Munson et al. |
| 5,653,966 A | 8/1997 | Bertoli et al. |
| 5,675,051 A | 10/1997 | Chauvin et al. |
| 5,747,409 A | 5/1998 | Commereuc |
| 5,824,354 A | 10/1998 | Ritter et al. |
| 5,840,942 A | 11/1998 | Oude Alink |
| 5,864,049 A | 1/1999 | Dos Santos et al. |
| 5,880,298 A | 3/1999 | Hillion et al. |
| 5,932,261 A | 8/1999 | Unnithan |
| 5,939,572 A | 8/1999 | Sibi et al. |
| 5,959,129 A | 9/1999 | van Dam et al. |
| 5,972,057 A | 10/1999 | Hayafuji et al. |
| 6,033,706 A | 3/2000 | Silkeberg et al. |
| 6,075,158 A | 6/2000 | Hill |
| 6,127,560 A | 10/2000 | Stidham et al. |
| 6,129,945 A | 10/2000 | Awad et al. |
| 6,162,480 A | 12/2000 | van Buuren et al. |
| 6,172,248 B1 | 1/2001 | Copeland et al. |
| 6,175,047 B1 | 1/2001 | Hori et al. |
| 6,207,209 B1 | 3/2001 | Jirjis et al. |
| 6,210,732 B1 | 4/2001 | Papanton |
| 6,248,911 B1 | 6/2001 | Canessa et al. |
| 6,251,460 B1 | 6/2001 | Ganguli et al. |
| 6,265,495 B1 | 7/2001 | Hirata et al. |
| 6,271,430 B2 | 8/2001 | Schwab et al. |
| 6,284,852 B1 | 9/2001 | Lynn et al. |
| 6,288,251 B1 | 9/2001 | Tsuto et al. |
| 6,303,837 B1 | 10/2001 | Gürtler et al. |
| 6,313,365 B1 | 11/2001 | Hori et al. |
| 6,368,648 B1 | 4/2002 | Bertram et al. |
| 6,376,581 B1 | 4/2002 | Tanaka et al. |
| 6,388,038 B1 | 5/2002 | Hirata et al. |
| 6,395,669 B1 | 5/2002 | Sartain et al. |
| 6,409,778 B1 | 6/2002 | Auschra et al. |
| 6,440,057 B1 | 8/2002 | Ergün et al. |
| 6,492,564 B1 | 12/2002 | Wiese et al. |
| 6,506,944 B1 | 1/2003 | Schwab et al. |
| 6,552,139 B1 | 4/2003 | Herrmann et al. |
| 6,552,208 B1 | 4/2003 | Alander et al. |
| 6,583,236 B1 | 6/2003 | Giardello et al. |
| 6,605,748 B2 | 8/2003 | Wagener et al. |
| 6,638,551 B1 | 10/2003 | Tazi et al. |
| 6,646,172 B1 | 11/2003 | Schwab et al. |
| 6,677,495 B1 | 1/2004 | Schwab et al. |
| 6,706,299 B2 | 3/2004 | Thengumpillil et al. |
| 6,740,134 B2 | 5/2004 | Angelico et al. |
| 6,761,869 B1 | 7/2004 | Virtanen |
| 6,800,316 B1 | 10/2004 | Perrut et al. |
| 6,833,149 B2 | 12/2004 | Jirjis et al. |
| 6,852,900 B2 | 2/2005 | Wurziger et al. |
| 6,900,347 B2 | 5/2005 | Paulson et al. |
| 6,916,448 B2 | 7/2005 | Commereuc et al. |
| 6,960,272 B1 | 11/2005 | Tokas et al. |
| 6,962,729 B2 | 11/2005 | Tokas et al. |
| 6,982,155 B1 | 1/2006 | Fukuda et al. |
| 6,998,050 B2 | 2/2006 | Nakajoh et al. |
| 7,025,851 B2 | 4/2006 | Caster et al. |
| 7,045,100 B2 | 5/2006 | Ergün et al. |
| 7,045,114 B2 | 5/2006 | Tonkovich et al. |
| 7,060,316 B2 | 6/2006 | Sakai et al. |
| 7,067,584 B2 | 6/2006 | Rink et al. |
| 7,119,216 B2 | 10/2006 | Newman et al. |
| 7,141,083 B2 | 11/2006 | Jordan |
| 7,144,433 B2 | 12/2006 | Jordan |
| 7,144,435 B2 | 12/2006 | Jordan |
| 7,160,338 B2 | 1/2007 | Jordan |
| 7,160,339 B2 | 1/2007 | Jordan |
| 7,176,336 B2 | 2/2007 | Maughon et al. |
| 7,220,289 B2 | 5/2007 | Jordan |
| 7,276,616 B2 | 10/2007 | Dwyer et al. |
| 7,320,809 B2 | 1/2008 | Friedman et al. |
| 7,361,621 B2 | 4/2008 | Yang et al. |
| 7,431,749 B2 | 10/2008 | Kim et al. |
| 7,442,248 B2 | 10/2008 | Timmons |
| 7,449,591 B2 | 11/2008 | Brenner et al. |
| 7,452,515 B1 | 11/2008 | Lafleur et al. |
| 7,507,846 B2 | 3/2009 | Pelly |
| 7,563,915 B2 | 7/2009 | Matson et al. |
| 7,576,227 B2 | 8/2009 | Lysenko et al. |
| 7,585,990 B2 | 9/2009 | van Toor et al. |
| 7,597,783 B2 | 10/2009 | Kruidenberg |
| 7,598,407 B2 | 10/2009 | Kruidenberg |
| 7,601,309 B2 | 10/2009 | Krupa et al. |
| 7,612,221 B2 | 11/2009 | Haas et al. |
| 7,626,047 B2 | 12/2009 | Nakayama et al. |
| 7,626,048 B2 | 12/2009 | Soane et al. |
| 7,645,807 B1 | 1/2010 | Goetsch et al. |
| 7,652,145 B2 | 1/2010 | Herrmann et al. |
| 7,652,156 B2 | 1/2010 | Hillion et al. |
| 7,666,234 B2 | 2/2010 | Ghosh et al. |
| 7,671,224 B2 | 3/2010 | Winde et al. |
| 7,695,533 B2 | 4/2010 | Kovacs et al. |
| 7,696,376 B2 | 4/2010 | Furuta |
| 7,696,398 B2 | 4/2010 | Burdett et al. |
| 7,718,833 B2 | 5/2010 | Potthast et al. |
| 7,737,233 B2 | 6/2010 | Obrecht et al. |
| 7,743,828 B2 | 6/2010 | Roddy et al. |
| 7,745,652 B2 | 6/2010 | Lysenko et al. |
| 7,750,172 B2 | 7/2010 | Grubbs et al. |
| 7,790,651 B2 | 9/2010 | Lin et al. |
| 7,806,945 B2 | 10/2010 | Jackam et al. |
| 7,812,185 B2 | 10/2010 | Burdett et al. |
| 7,812,187 B2 | 10/2010 | Kawashima et al. |
| 7,838,711 B2 | 11/2010 | Herweck et al. |
| 7,863,471 B2 | 1/2011 | Krause et al. |
| 2003/0135080 A1 | 7/2003 | Botha et al. |
| 2005/0070750 A1 | 3/2005 | Newman et al. |
| 2005/0160666 A1 | 7/2005 | Fujita |
| 2006/0042158 A1 | 3/2006 | Lee |
| 2006/0047176 A1 | 3/2006 | Gartside et al. |
| 2006/0069274 A1 | 3/2006 | Dias De Moraes et al. |
| 2006/0167326 A1 | 7/2006 | Burdett et al. |
| 2007/0011943 A1 | 1/2007 | Lin |
| 2007/0151146 A1 | 7/2007 | Lee et al. |
| 2007/0179302 A1 | 8/2007 | Olivier-Bourbigou et al. |
| 2007/0208206 A1 | 9/2007 | Obrecht et al. |
| 2007/0217965 A1 | 9/2007 | Johnson et al. |
| 2007/0225536 A1 | 9/2007 | Lutz |
| 2007/0227400 A1 | 10/2007 | Zullo et al. |
| 2007/0277430 A1 | 12/2007 | Jackman et al. |
| 2008/0047194 A1 | 2/2008 | Prawoto |
| 2008/0097114 A1 | 4/2008 | Bakshi |
| 2008/0098645 A1 | 5/2008 | Renninger et al. |
| 2008/0103346 A1 | 5/2008 | Burdett et al. |
| 2008/0115407 A1 | 5/2008 | Hoffman |
| 2008/0119664 A1 | 5/2008 | Sinoncelli et al. |
| 2008/0148627 A1 | 6/2008 | Suraci et al. |
| 2008/0202021 A1 | 8/2008 | Powell |
| 2008/0229654 A1 | 9/2008 | Bradin |
| 2008/0244962 A1 | 10/2008 | Abhari et al. |
| 2008/0282606 A1 | 11/2008 | Plaza et al. |
| 2008/0300434 A1 | 12/2008 | Cortright et al. |
| 2008/0306230 A1 | 12/2008 | Pan et al. |
| 2009/0038209 A1 | 2/2009 | Farid et al. |
| 2009/0048459 A1 | 2/2009 | Tupy et al. |

(56) References Cited

U.S. PATENT DOCUMENTS

| | | |
|---|---|---|
| 2009/0069516 A1 | 3/2009 | Obrecht et al. |
| 2009/0112007 A1 | 4/2009 | Lin et al. |
| 2009/0143544 A1 | 6/2009 | Lysenko et al. |
| 2009/0145022 A1 | 6/2009 | Ng et al. |
| 2009/0163731 A1 | 6/2009 | Martin et al. |
| 2009/0165366 A1 | 7/2009 | Jovanovic et al. |
| 2009/0178330 A1 | 7/2009 | Lebron Parejo et al. |
| 2009/0183420 A1 | 7/2009 | Cobb |
| 2009/0203860 A1 | 8/2009 | Bergbreiter et al. |
| 2009/0287004 A1 | 11/2009 | Bergman et al. |
| 2009/0306441 A1 | 12/2009 | Basset et al. |
| 2009/0307966 A1 | 12/2009 | Yan et al. |
| 2009/0324514 A1 | 12/2009 | Awad |
| 2009/0326295 A1 | 12/2009 | Krupa et al. |
| 2010/0010246 A1 | 1/2010 | Yan et al. |
| 2010/0018902 A1 | 1/2010 | Brownscombe et al. |
| 2010/0022789 A1 | 1/2010 | Mignani et al. |
| 2010/0037667 A1 | 2/2010 | Calderon et al. |
| 2010/0043280 A1 | 2/2010 | Morris |
| 2010/0087671 A1 | 4/2010 | Lemke |
| 2010/0093944 A1 | 4/2010 | Müller et al. |
| 2010/0094034 A1 | 4/2010 | Kaido et al. |
| 2010/0107474 A1 | 5/2010 | Talwar et al. |
| 2010/0113719 A1 | 5/2010 | Patton et al. |
| 2010/0121087 A1 | 5/2010 | Banavali et al. |
| 2010/0130769 A1 | 5/2010 | Banavali et al. |
| 2010/0132252 A1 | 6/2010 | Nakazono |
| 2010/0140136 A1 | 6/2010 | Spilker et al. |
| 2010/0160506 A1 | 6/2010 | Wu et al. |
| 2010/0163459 A1 | 7/2010 | Odueyungbo |
| 2010/0166620 A1 | 7/2010 | Gurski et al. |
| 2010/0167910 A1 | 7/2010 | Odueyungbo |
| 2010/0191008 A1 | 7/2010 | Olson |
| 2010/0212219 A1 | 8/2010 | Siochi et al. |
| 2010/0212220 A1 | 8/2010 | Tirmizi |
| 2010/0223842 A1 | 9/2010 | Thesz et al. |
| 2010/0228042 A1 | 9/2010 | Chun et al. |
| 2010/0234625 A1 | 9/2010 | Papadogianakis et al. |
| 2010/0236984 A1 | 9/2010 | Brookhart et al. |
| 2010/0242348 A1 | 9/2010 | Chen et al. |
| 2010/0243961 A1 | 9/2010 | Hilton et al. |
| 2010/0252485 A1 | 10/2010 | Soane et al. |
| 2010/0263263 A1 | 10/2010 | O'Rear |
| 2010/0264015 A1 | 10/2010 | Portnoff et al. |
| 2010/0307051 A1 | 12/2010 | Tremblay et al. |
| 2010/0331558 A1 | 12/2010 | Kao et al. |
| 2011/0015419 A1 | 1/2011 | Pendleton et al. |

FOREIGN PATENT DOCUMENTS

| | | | |
|---|---|---|---|
| WO | WO 01/83097 | A2 | 11/2001 |
| WO | WO 02/10114 | A2 | 2/2002 |
| WO | WO 02/076920 | A1 | 10/2002 |
| WO | WO 2006/043281 | A1 | 4/2006 |
| WO | WO 2006/052688 | A2 | 5/2006 |
| WO | WO 2006/076364 | A2 | 7/2006 |
| WO | WO 2007/027669 | A1 | 3/2007 |
| WO | WO 2007/027955 | A2 | 3/2007 |
| WO | WO 2007/092632 | A2 | 8/2007 |
| WO | WO 2007/113530 | A2 | 10/2007 |
| WO | WO 2008/046106 | A2 | 4/2008 |
| WO | WO 2008/048520 | A2 | 4/2008 |
| WO | WO 2008/048522 | A1 | 4/2008 |
| WO | WO 2008/058664 | A1 | 5/2008 |
| WO | WO 2008/063322 | A2 | 5/2008 |
| WO | WO 2008/104929 | A1 | 9/2008 |
| WO | WO 2008/152371 | A1 | 12/2008 |
| WO | WO 2009/007234 | A1 | 1/2009 |
| WO | WO 2009/020667 | A1 | 2/2009 |
| WO | WO 2009/065229 | A1 | 5/2009 |
| WO | WO 2009/089591 | A1 | 7/2009 |
| WO | WO 2010/021740 | A1 | 2/2010 |
| WO | WO 2010/051268 | A1 | 5/2010 |
| WO | WO 2010/062958 | A1 | 6/2010 |
| WO | WO 2010/074738 | A1 | 7/2010 |
| WO | WO 2010/096549 | A2 | 8/2010 |
| WO | WO 2010/097519 | A2 | 9/2010 |
| WO | WO 2010/104844 | A2 | 9/2010 |
| WO | WO 2010/124030 | A1 | 10/2010 |

OTHER PUBLICATIONS

Parkash, Surinder (2003). Refining Processes Handbook. Chapter 1: Refinery Distillation, p. 15. Elsevier.*

Ackman, R.G. et al., "Ozonolysis of Unsaturated Fatty Acids," *Can. J. Chem.*, vol. 39, 1961, pp. 1956-1963.

Throckmorton, P.E. et al., "Pilot Run, Plant Design and Cost Analysis for Reductive Ozonolysis of Methyl Soyate," *Research and Development Laboratories*, 1967, p. 643.

Throckmorton, P.E. et al., "Reductive Ozonolysis of Soybean Oil: Laboratory Optimization of Process Variables," *Research and Development Laboratories*, p. 641.

Foglia, T.A., et al., "Oxidation of Unsaturated Fatty Acids With Ruthenium and Osmium Tetroxide," *J. Am. Oil Chemists' Soc.*, vol. 54, Nov. 1977, pp. 870A-872A.

Rüsch gen. Klaas, M., et al., "Transition-Metal Catalyzed Oxidative Cleavage of Unsaturated Fatty Acids," *Fat Sci. Technol.*, vol. 95(10), 1995, pp. 359-367.

Turnwald, S.E., et al., "Oleic Acid Oxidation Using Hydrogen Peroxide in Conjunction With Transition Metal Catalysis," *Journal of Materials Science Letters*, vol. 17, 1998, pp. 1305-1307.

Oakley, Michael A., et al., "Practical Dihydroxylation and C-C Cleavage of Unsaturated Fatty Acids," *Journal of Molecular Catalysis A: Chemical*, vol. 150, 1999, pp. 105-111.

Noureddini, H. et al., "Liquid-Phase Catalytic Oxidation of Unsaturated Fatty Acids," Journal of American Oil Chemists' Society, vol. 76, No. 3, 1999, pp. 305-312.

Santacesaria, E., et al., "Oxidative Cleavage of the Double Bond of Monoenic Fatty Chains in Two Steps: A New Promising Route to Azelaic Acid and Other Industrial Products," *Ind. Eng. Chem. Res.*, vol. 39, 2000, pp. 2766-2771.

Santacesaria, E. et al., "Double Bond Oxidative Cleavage of Monoenic Fatty Chains," *Catalysis Today*, vol. 79-80, 2003, pp. 59-65.

Bryan, Tom, "Adsorbing It All," *Biodiesel Magazine*, Mar. 2005, pp. 40-43.

Patel, Jim et al., "High Conversion and Productive Catalyst Turnovers in Cross-Metathesis Reactions of Natural Oils With 2-Butene," *Green Chem.*, vol. 8, 2006, pp. 450-454.

Kram, Jerry W., "Cleaner and Clearer," *Biodiesel Magazine*, Jan. 2008, 4 pages.

International Search Report for International Application No. PCT/US2009/065858, dated Jan. 20, 2010, 1 page.

International Preliminary Report on Patentability for International Application No. PCT/US2009/065858, dated May 31, 2011, 6 pages.

Hemighaus, G. et al., "Aviation Fuels Technical Review," FTR-3, Chevron, 2006, 96 pages.

Medes Group, "Jet Fuel", available online at http://www.mepetroleum.com/jet_fuel.htm, 2000, 1 page.

P.E. Throckmorton et al., Pilot Run, Plant Design and Cost Analysis for Reductive Ozonolysis of Methyl Soyate, Jan. 21, 1972, pp. 643-648, vol. 49, Journal of the American Oil Chemists' Society.

P.E. Throckmorton et al., Reductive Ozonolysis of Soybean Oil: Labratory Optimization of Process Variables, Jan. 21, 1972, pp. 641-642, vol. 49, Journal of the American Oil Chemists' Society.

* cited by examiner

METHODS OF PRODUCING JET FUEL FROM NATURAL OIL FEEDSTOCKS THROUGH OXYGEN-CLEAVED REACTIONS

This application claims the benefit under 35 U.S.C. § 371 of International Application No. PCT/US2009/065858, filed Nov. 25, 2009, and entitled METHODS OF PRODUCING JET FUEL FROM NATURAL OIL FEEDSTOCKS THROUGH OXYGEN-CLEAVED REACTIONS, which claims the benefit of U.S. Provisional Application having Ser. No. 61/118,344, filed Nov. 26, 2008, and entitled METHODS OF PRODUCING JET FUEL FROM NATURAL OIL FEEDSTOCKS, the disclosures of which are incorporated herein by reference.

TECHNICAL FIELD OF THE INVENTION

This application relates to methods of producing jet fuel through oxygen-cleaved reactions of natural feedstocks.

BACKGROUND OF THE INVENTION

Ozonolysis is a chemical reaction generally known in the art. Ozonolysis is the reaction of an olefin with ozone in which the unsaturated carbon-carbon bond is cleaved and replaced with a double bond to oxygen, represented below in Equation I.

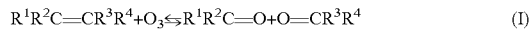

$$R^1R^2C=CR^3R^4+O_3 \leftrightarrows R^1R^2C=O+O=CR^3R^4 \qquad (I)$$

wherein $R^1$, $R^2$, $R^3$, and $R^4$ are organic groups or hydrogen.

Oxidative cleavage is also a chemical process that is generally known in the art. Examples for oxidative cleavage reaction conditions involving olefinic compounds are described in U.S. Pat. Nos. 5,596,111, and 5,939,572, herein incorporated by reference. In the oxidative cleavage reaction, carboxylic acids are prepared by reacting an olefinic compound with oxygen in the presence of a peroxide, solvent, and inorganic oxide catalyst, represented below in Equation II.

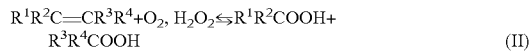

$$R^1R^2C=CR^3R^4+O_2, H_2O_2 \leftrightarrows R^1R^2COOH+R^3R^4COOH \qquad (II)$$

wherein $R^1$, $R^2$, $R^3$, and $R^4$ are organic groups or hydrogen.

In recent years, there has been an increased demand for environmentally friendly techniques for manufacturing materials typically derived from petroleum sources. For example, researchers have been studying the feasibility of manufacturing biofuels, waxes, plastics, and the like, using natural feedstocks, such as vegetable and seed-based oils.

Natural feedstocks of interest include, for example, natural oils (e.g., vegetable oils, fish oil, animal fats) and derivatives of natural oils, such as fatty acids and fatty acid alkyl (e.g., methyl) esters. These feedstocks may be converted into industrially useful chemicals (e.g., waxes, plastics, cosmetics, biofuels, etc.) by any number of different reactions.

In recent years, there has been an increased demand for petroleum-based transportation fuels. Concerns exist that the world's petroleum production may not be able to keep up with demand. Additionally, the increased demand for petroleum-based fuels has resulted in a higher production of greenhouse gases. In particular, the airline industry accounts for greater than 10% of the greenhouse gases within the United States. Due to the increased demand for fuel and increased production of greenhouse gases, there is a need to explore methods of producing environmentally-friendly, alternative fuel sources. In particular, there is a need to explore methods of producing environmentally friendly jet fuel from a natural feedstock.

BRIEF SUMMARY OF THE INVENTION

Methods are disclosed for producing jet fuel from a natural oil through an oxygen-cleaved reaction, such as ozonolysis or oxidative cleavage.

In accordance with the present invention, a feedstock comprising a natural oil is reacted with oxygen under conditions sufficient to form an oxygen-cleaved product. The method further comprises hydrogenating the oxygen-cleaved product under conditions sufficient to form a jet fuel composition.

In one aspect, the method comprises reacting a feedstock comprising a natural oil, such as soybean oil, with ozone under conditions sufficient to form an ozone-cleaved product. The method further comprises hydrogenating the ozone-cleaved product under conditions sufficient to form a jet fuel composition.

In another aspect, the method comprises reacting a feedstock comprising a natural oil, such as soybean oil, with oxygen under conditions sufficient to form an oxidative-cleaved product. The method further comprises hydrogenating the oxidative-cleaved product under conditions sufficient to form a jet fuel composition.

DETAILED DESCRIPTION OF THE INVENTION

Figure 1:
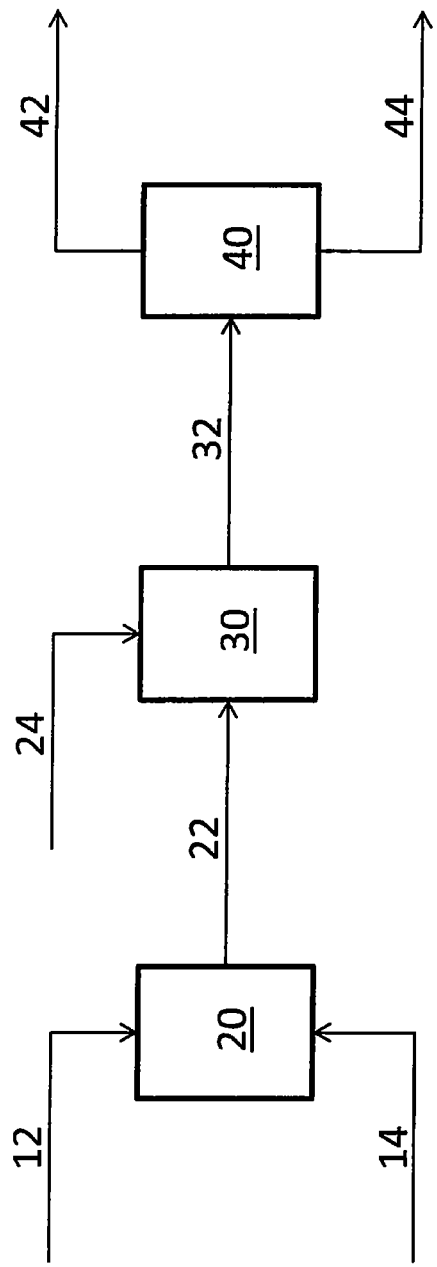
FIG. 1 is a schematic diagram of a process to produce a jet fuel composition from a natural oil reacted with ozone.

The present application relates to methods of producing jet fuel from natural oil feedstock.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the terms "natural oil," "natural feedstock," or "natural oil feedstock" refer to an oil derived from a plant or animal source. The term "natural oil" includes natural oil derivatives, unless otherwise indicated. Examples of natural oils include, but are not limited to, vegetable oils, algae oils, animal fats, tall oils, derivatives of these oils, combinations of any of these oils, and the like. Representative examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, and castor oil. Representative examples of animal fats include lard, tallow, chicken fat, yellow grease, and fish oil. Tall oils are by-products of wood pulp manufacture.

As used herein, the term "natural oil derivatives" refers to the compounds or mixture of compounds derived from the natural oil using any one or combination of methods known in the chemical arts. Such methods include saponification, esterification, hydrogenation (partial or full), isomerization, oxidation, and reduction. For example, the natural oil derivative may be a fatty acid methyl ester (FAME) derived from the glyceride of the natural oil. Representative examples of natural oil derivatives include gums, phospholipids, soapstock, acidulated soapstock, distillate or distillate sludge, fatty acids and fatty acid alkyl (e.g., methyl) esters of the natural oil. For example, the natural oil derivative may be a fatty acid methyl ester (FAME) derived from the glyceride of a natural oil. In some preferred embodiments, a feedstock includes canola or soybean oil, for example, refined, bleached, and deodorized soybean oil (i.e., RBD soybean oil). Soybean oil is an unsaturated polyol ester of glycerol that typically comprises about 95% weight or greater (e.g., 99% weight or greater) triglycerides of fatty acids. Major fatty acids in the polyol esters of soybean oil include saturated fatty acids, for example, palmitic acid (hexadecanoic acid) and stearic acid (octadecanoic acid), and unsaturated fatty acids, for example, oleic acid (9-octadecenoic acid), linoleic acid (9, 12-octadecadienoic acid), and linolenic acid (9,12,15-octadecatrienoic acid).

As used herein, the term "yield" may refer to the total weight of jet fuel produced from the oxygen-cleaved and hydrogenation reactions. It may be defined in terms of a yield %, wherein the total weight of the jet fuel produced is divided by the total weight of the natural oil feedstock. It may also refer to the total weight of the jet fuel following a separation step and/or isomerization reaction.

As used herein, the term "oxygen-cleaved product" may refer to either an "ozone-cleaved product" or an "oxidative-cleaved product."

As used herein, the term "oxygen" may refer to ozone ($O_3$), oxygen gas ($O_2$), or elemental oxygen (O).

As used herein, the term "ozone-cleaved product" refers to the product from the reaction of an olefin with ozone under conditions sufficient to have the unsaturated carbon-carbon bond cleaved and replaced with a double bond to oxygen.

As used herein, the term "oxidative-cleaved product" refers to the product from the reaction of an olefin with oxygen gas under conditions sufficient to have the unsaturated carbon-carbon bond cleaved and replaced with a double bound to oxygen or a carboxyl group.

As used herein, the term "isomerization," "isomerize(s)," or "isomerizing" refers to the reaction and conversion of straight-chain hydrocarbon compounds, such as normal paraffins or normal olefins, into branched hydrocarbon compounds, such as iso-paraffins or iso-olefins. For example, n-pentane may be isomerized into a mixture of n-pentane, 2-methylbutane, and 2,2-dimethylpropane. Isomerization of normal paraffins or normal olefins may be used to improve the overall properties of a fuel composition.

As used herein, the term "yield" may refer to the total weight of jet fuel produced from the oxygen-cleaved and hydrogenation reactions. It may also refer to the total weight of the jet fuel following a separation step and/or isomerization reaction. It may be defined in terms of a yield %, wherein the total weight of the jet fuel produced is divided by the total weight of the natural oil feedstock and low-weight olefin, combined.

As used herein, the term "jet fuel" or "aviation fuel" may refer to kerosene or naphtha-type fuel cuts, or military-grade jet fuel compositions. "Kerosene-type" jet fuel (including Jet A and Jet A-1) has a carbon number distribution between about 8 and 16. Jet A and Jet A-1 typically have a flash point between 38° C. and 66° C., an auto ignition temperature of approximately 210° C., a freeze point between approximately −47° C. and −40° C., a density of approximately 0.8 g/cc at 15° C., and an energy density of approximately 42.8-43.2 MJ/kg. "Naphtha-type" or "wide-cut" jet fuel (including Jet B) has a carbon number between about 5 and 15. Jet B typically comprises a flash point between approximately −23° C. and 0° C., an auto ignition temperature of approximately 250° C., a freeze point of approximately −65° C., a density of approximately 0.78 g/cc, and an energy density of approximately 42.8-43.5 MJ/kg. "Military grade" jet fuel refers to the Jet Propulsion or "JP" numbering system (JP-1, JP-2, JP-3, JP-4, JP-5, JP-6, JP-7, JP-8, etc.). Military grade jet fuels may comprise alternative or additional additives to have higher flash points than Jet A, Jet A-1, or Jet B in order to cope with heat and stress endured during supersonic flight. Additionally, fuel compositions may generally refer to materials meeting required specifications or to blend components that are useful in formulating fuel compositions but, by themselves, do not meet all of the required specifications for a fuel.

As used herein, the term "carbon number distribution" may refer to the range of compounds present in a composition, wherein each compound is defined by the number of carbon atoms present. For example, jet fuel typically comprises a distribution of hydrocarbon compounds wherein a majority of those compounds have between 5 and 16 carbon atoms each.

As used herein, the term "energy density" may refer to the amount of energy stored in a given system per unit mass (MJ/kg) or per unit volume (MJ/L). For example, the energy density of jet fuel is typically greater than 40 MJ/kg.

In accordance with the present invention, in one embodiment, a high yield jet fuel composition can be created by reacting a natural oil with ozone.

As shown in FIG. 1, a natural oil 12 is combined with ozone 14 in a reactor 20. Typical reaction conditions for ozonolysis are well-known in the art, as described in U.S. Pat. Nos. 3,481,954; 3,868,392; and 4,085,127, herein incorporated by reference. The natural oil preferably is a vegetable oil or vegetable oil derivative, such as soybean oil.

The ozonolysis reaction in the reactor 20 produces an ozone-cleaved product 22. In one embodiment, based upon the quality of the ozone-cleaved product 22, it is preferable to isomerize the ozone-cleaved product 22 to assist in targeting the desired jet fuel properties like the flash point, freeze point, or energy density. Isomerization reactions are well-known in the art, as described in U.S. Pat. Nos. 3,150,205; 4,210,771; 5,095,169; and 6,214,764, herein incorporated by reference. An isomerization reaction at this stage may also crack some of the $C_{18+}$ compounds, and assist in producing a jet fuel composition having compounds within the desired carbon number range of 5 to 16.

In one embodiment, the ozone-cleaved product 22 is sent to a hydrogenation unit 30. In certain embodiments, it is preferable to separate the byproducts from the ozone-cleaved product 22 prior to introduction to the hydrogenation unit 30.

In the hydrogenation unit, hydrogen gas 24 is reacted with the ozone-cleaved product 22 in the hydrogenation unit 30. During hydrogenation, the aldehydes from the ozone-cleaved products 22 are reduced by the hydrogen gas 24. Additionally, the natural oil esters, acids, and alcohols are reduced into hydrocarbons. The resulting hydrogenated product 32 includes hydrocarbons with a distribution preferably centered around approximately $C_9$ hydrocarbons. The hydrogenated product 32 may also contain byproducts from the hydrogenation and ozonolysis reactions, including water or heavy hydrocarbon chains ($C_{18}$+). Process conditions for the hydrogenation step are well-known in the art, as discussed in PCT/EP2007/009668.

The hydrogenated product 32 may be used as a jet fuel composition. Alternatively, the hydrogenated product 32 may be sent to a separation unit 40 to remove any byproducts 44 (i.e. water, $C_{18}+$) from the desired jet fuel composition 42.

In one embodiment, the hydrogenated product 32 may be separated into a targeted jet fuel composition fraction 42, a light-ends fraction (not shown), and a heavy-ends byproducts fraction, shown as 44 for this embodiment. The hydrogenated product 32 may contain byproducts from the ozonolysis reaction that would be separated at this stage if a separation step was not performed prior to the hydrogenation step. In one embodiment, distillation is used to separate the fractions. Alternatively, the heavy-ends byproducts fraction can be separated from the target jet fuel composition fraction by cooling the hydrogenated product 32 to approximately 38-66° C., or −47-40° C., or −65° C. and then removing the solid fraction by techniques known in the art such as filtration or centrifugation.

In another embodiment, based upon the quality of the hydrogenated product 32 or the jet fuel composition 42, there may be a need for further processing to target the desired jet fuel properties like the flash point, freeze point, or energy density. For instance, there may be a need to isomerize the n-paraffin hydrocarbons in the hydrogenated product 32 or jet fuel composition 42, and produce a mixture of n-paraffin and iso-paraffin compounds. Isomerization reactions are well-known in the art, as described in U.S. Pat. Nos. 3,150,205; 4,210,771; 5,095,169; and 6,214,764, herein incorporated by reference.

In one embodiment, ozonolysis of a natural oil can produce a jet fuel composition 42 having at least 20 wt % of $C_9$ compounds. More preferably, ozonolysis may lead to a jet fuel composition having at least 30, 40, or 50 wt % $C_9$ compounds. In these compositions, various performance parameters are targeted for specific types of jet fuel.

Figure 2:
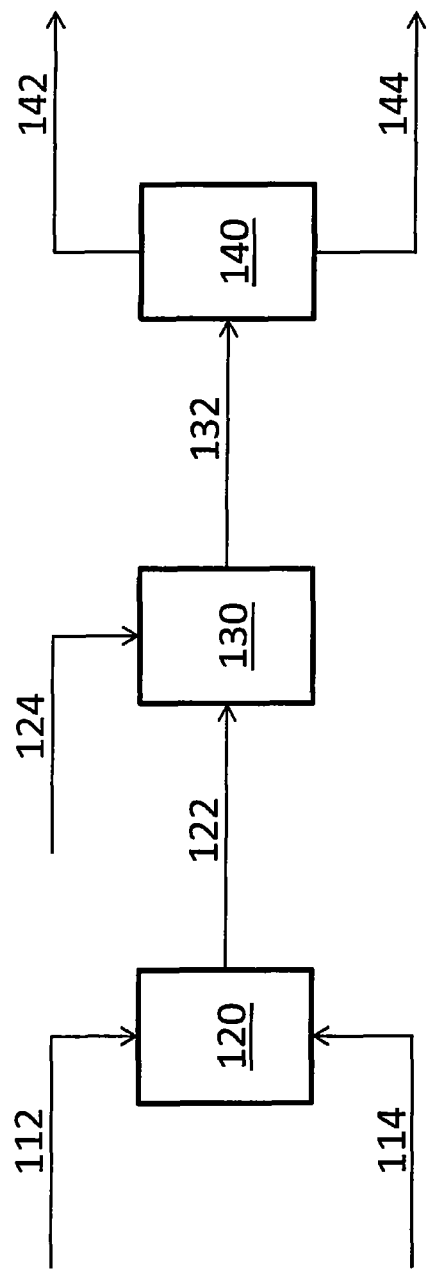
FIG. 2 is a schematic diagram of a process to produce a jet fuel composition from a natural oil reacted with oxygen gas.

In another embodiment, as shown in FIG. 2, a high yield jet fuel composition is created by reacting a natural oil with oxygen gas under conditions sufficient to cleave the natural oil olefins. Typical conditions for oxidative cleavage reactions are known in the art, as described in U.S. Pat. Nos. 5,596,111; 5,864,049; and 5,939,572, herein incorporated by reference. For example, the natural oil 112 may be reacted with oxygen gas 114 in a reactor 120 in the presence of an organic solvent, an inorganic oxide catalyst, and a peroxidant such as hydrogen peroxide. The natural oil 112 preferably is a vegetable oil or vegetable oil derivative, such as soybean oil.

The oxidative cleavage reaction in the reactor 120 produces an oxidative-cleaved product 122. In one embodiment, based upon the quality of the oxidative-cleaved product 122, it is preferable to isomerize the oxidative-cleaved product 122 to assist in targeting the desired jet fuel properties like the flash point, freeze point, or energy density. Isomerization reactions are well-known in the art, as described in U.S. Pat. Nos. 3,150,205; 4,210,771; 5,095,169; and 6,214,764, herein incorporated by reference. An isomerization reaction at this stage may also crack some of the $C_{18+}$ compounds, and assist in producing a jet fuel composition having compounds within the desired carbon number range of 5 to 16.

In one embodiment, the oxidative-cleaved product 122 is sent to a hydrogenation unit 130. In certain embodiments, it is preferable to separate the byproducts from the oxidative-cleaved product 122 prior to introduction to the hydrogenation unit 130.

In the hydrogenation unit 130, hydrogen gas 124 is reacted with the oxidative-cleaved product 122. During hydrogenation, carboxylic acids and aldehydes from the oxidative-cleaved product 122 are reduced by the hydrogen gas 124. Additionally, the natural oil esters, acids, and alcohols are reduced into hydrocarbons. The resulting hydrogenated product 132 includes hydrocarbons with a distribution preferably centered at approximately $C_9$ hydrocarbons. The hydrogenated product 132 may also contain byproducts from the hydrogenation and oxidative-cleavage reactions, including water or heavy hydrocarbon chains ($C_{18}+$). Process conditions for the hydrogenation step are well-known in the art, as discussed in PCT/EP2007/009668.

The hydrogenated product may function as a jet fuel composition. Alternatively, the hydrogenated product may be sent to a separation unit 140 to remove any byproducts 144 (i.e. water, $C_{18}+$) from the desired jet fuel composition 142. In one embodiment, the hydrogenated product 132 may be separated into a targeted jet fuel composition fraction 142, a light-ends fraction (not shown), and a heavy-ends byproducts fraction shown as 144 for this embodiment. The hydrogenated product may contain byproducts from the oxidative-cleavage reaction that would be separated at this stage if a separation step was not performed prior to the hydrogenation step. In one embodiment, distillation may be used to separate the fractions. Alternatively, the heavy-ends byproducts fraction can be separated from the target jet fuel composition fraction by cooling the hydrogenated product 132 to approximately 38-66° C., or −47-40° C., or −65° C. and then removing the solid fraction by techniques known in the art such as filtration or centrifugation.

In another embodiment, based upon the quality of the hydrogenated product 132 or the jet fuel composition 142, there may be a need for further processing to target the desired jet fuel properties like the flash point, freeze point, or energy density. For instance, there may be a need to isomerize the n-paraffin hydrocarbons in the hydrogenated product 132 or jet fuel composition 142, and produce a mixture of n-paraffin and iso-paraffin compounds.

Oxidative-cleavage of certain natural oils can produce a jet fuel composition having at least 40 wt % of $C_9$ compounds, as shown in the table below. Alternatively, for certain natural oils, the jet fuel composition may comprise more than 50 wt % of $C_{12}$ compounds. In these compositions, various performance parameters are targeted for specific types of jet fuel.

In one embodiment, the natural oil is converted into a kerosene-type jet fuel comprising a carbon number distribution between 8 and 16 carbon numbers. This kerosene-type jet fuel distribution includes Jet A or Jet A-1. In this embodiment, it is preferable to have a flash point between approximately 38° C. and 66° C. It is also preferable to have an auto ignition temperature of approximately 210° C. It is also preferable to have a freeze point between approximately −47° C. and −40° C. (closer to −47° C. for a Jet A-1 type fuel and closer to −40° C. for a Jet A type fuel). It is also preferable to have a density of approximately 0.8 g/cc at 15° C. It is also preferable to have an energy density greater than 40 MJ/kg. It is more preferable to have an energy density between 42 and 48 MJ/kg. It is even more preferable to have an energy density for kerosene-type jet fuel of approximately 42.8-43.2 MJ/kg.

Kerosene-type jet fuel is targeted by reacting the natural oil with ozone to achieve desired jet fuel properties as well as a desired distribution between $C_8$ and $C_{16}$.

In another embodiment, the natural oil is converted into a naphtha-type jet fuel comprising a carbon number distribution between 5 and 15 carbon numbers. This naphtha-type jet fuel distribution includes Jet B. In this embodiment, it is preferable to have a flash point between approximately −23° C. and 0° C. It is also preferable to have an auto ignition temperature of approximately 250° C. It is also preferable to have a freeze point of approximately −65° C. It is also preferable to have a density of approximately 0.78 g/cc at 15° C. It is also preferable to have an energy density greater than 40

MJ/kg. It is more preferable to have an energy density between 42 and 48 MJ/kg. It is even more preferable to have an energy density for naphtha-type jet fuel of approximately 42.8-43.5 MJ/kg.

Naphtha-type jet fuel is targeted by reacting the natural oil with ozone to achieve desired jet fuel properties as well as a desired distribution between $C_5$ and $C_{15}$.

The invention will now be described with reference to the following non-limiting example.

EXAMPLE

Various natural oils are reacted with oxygen gas under conditions sufficient to convert the natural oils into carboxylic acids and aldehydes via an oxidative cleavage reaction. The oxidative-cleaved product is then reacted with hydrogen gas under conditions sufficient to convert the oxidative-cleaved product into hydrocarbons. The distribution of hydrocarbons from each natural oil is shown in the table below, as compared to a typical jet fuel distribution from fossil fuels.

TABLE

| Natural oil | C4 | C5 | C6 | C7 | C8 | C9 | C10 | C11 | C12 | C13 | C14+ |
|---|---|---|---|---|---|---|---|---|---|---|---|
| Canola oil | 0.0 | 0.0 | 6.9 | 0.0 | 0.0 | 85.7 | 0.0 | 0.6 | 0.0 | 0.0 | 6.8 |
| Chicken fat | 0.0 | 0.0 | 7.0 | 0.0 | 0.0 | 61.0 | 0.0 | 0.0 | 0.2 | 0.0 | 31.8 |
| Coconut oil | 0.0 | 0.0 | 1.2 | 0.0 | 9.0 | 9.4 | 7.5 | 0.0 | 58.9 | 0.0 | 13.9 |
| Corn oil | 0.0 | 0.0 | 21.4 | 0.0 | 0.0 | 62.9 | 0.0 | 0.0 | 0.0 | 0.0 | 15.7 |
| Cottonseed oil | 0.0 | 0.0 | 20.2 | 0.0 | 0.0 | 50.3 | 0.0 | 0.0 | 0.0 | 0.0 | 29.5 |
| Lard | 0.0 | 0.0 | 3.6 | 0.0 | 0.0 | 56.3 | 0.1 | 0.8 | 0.1 | 0.0 | 39.1 |
| Linseed oil | 0.0 | 0.0 | 7.8 | 0.0 | 0.0 | 78.8 | 0.0 | 0.0 | 0.0 | 0.0 | 13.4 |
| Palm oil | 0.0 | 0.0 | 3.3 | 0.0 | 0.0 | 45.6 | 0.0 | 0.0 | 0.3 | 0.0 | 50.8 |
| Palm kernel oil | 0.0 | 0.0 | 1.2 | 0.0 | 4.3 | 18.5 | 4.6 | 0.0 | 58.5 | 0.0 | 12.9 |
| Peanut oil | 0.0 | 0.0 | 11.8 | 0.0 | 0.0 | 69.8 | 0.0 | 0.9 | 0.0 | 0.0 | 17.5 |
| Rapeseed oil (erucic) | 0.0 | 0.0 | 6.4 | 0.0 | 0.0 | 52.1 | 0.0 | 8.6 | 0.0 | 26.9 | 6.1 |
| Rice bran oil | 0.0 | 0.0 | 12.4 | 0.0 | 0.1 | 66.8 | 0.1 | 0.2 | 0.4 | 0.0 | 20.0 |
| Safflower oil | 0.0 | 0.0 | 30.1 | 0.0 | 0.0 | 59.8 | 0.0 | 0.0 | 0.0 | 0.0 | 10.2 |
| Safflower oil (high oleic) | 0.0 | 0.0 | 4.2 | 0.0 | 0.0 | 87.9 | 0.0 | 0.0 | 0.0 | 0.0 | 7.9 |
| Soybean oil | 0.0 | 0.0 | 20.7 | 0.0 | 0.0 | 62.2 | 0.0 | 0.0 | 0.0 | 0.0 | 17.1 |
| Sunflower oil | 0.0 | 0.0 | 26.1 | 0.0 | 0.0 | 60.2 | 0.0 | 0.0 | 0.5 | 0.0 | 13.2 |
| Tallow (beef) | 0.0 | 0.0 | 0.8 | 0.0 | 0.0 | 47.1 | 0.1 | 0.0 | 0.1 | 0.0 | 51.8 |
| Tallow (mutton) | 0.0 | 0.0 | 1.6 | 0.0 | 0.0 | 43.3 | 0.2 | 0.0 | 0.3 | 0.0 | 54.6 |
| Jet fuel derived from fossil fuel | 0 | 0.1 | 0.2 | 1.75 | 4 | 5 | 8.2 | 11.75 | 9 | 4 | 56 |

While the invention as described may have modifications and alternative forms, various embodiments thereof have been described in detail. Further, while the present invention has been described in terms of non-limiting examples, it will be understood, of course, that the invention is not limited thereto since modifications may be made to those skilled in the art, particularly in light of the foregoing teachings.

What is claimed is:

1. A method of producing a jet fuel composition comprising:
   providing a feedstock comprising a natural oil;
   reacting the feedstock with oxygen under conditions sufficient to form an oxygen-cleaved product; and
   hydrogenating the oxygen-cleaved product under conditions sufficient to form a hydrogenated product comprising a jet fuel composition and at least one byproduct,
   wherein the hydrogenated product comprises approximately greater than 40 wt% $C_9$ paraffin compounds or approximately greater than 50 wt% $C_{12}$ paraffin prior to any separating of the at least one byproduct from the jet fuel composition.

2. The method of claim 1, wherein the jet fuel composition has an energy density of greater than approximately 40 MJ/kg.

3. The method of claim 1, further comprising isomerizing the oxygen-cleaved product prior to the hydrogenating.

4. The method of claim 1, further comprising isomerizing the jet fuel composition, wherein a fraction of normal-paraffin compounds in the jet fuel composition are isomerized into iso-paraffin compounds.

5. The method of claim 1, further comprising separating $C_{18}$+compounds and water from the jet fuel composition.

6. The method of claim 5, wherein the $C_{18}$+compounds are removed by at least one of the following: distillation, filtration, or centrifugation.

7. The method of claim 5, wherein the jet fuel composition is a kerosene-type jet fuel having a carbon number distribution between 8 and 16 carbon numbers.

8. The method of claim 7, wherein the kerosene-type jet fuel has:
   a flash point between approximately 38° C. and 66° C.;
   an auto ignition temperature of approximately 210° C.; and
   a freeze point between approximately −47° C. and −40° C.

9. The method of claim 5, wherein the jet fuel composition is a naphtha-type jet fuel having a carbon number distribution between 5 and 15 carbon numbers.

10. The method of claim 9, wherein the naphtha-type jet fuel has:
    a flash point between approximately −23° C. and 0° C.;
    an auto ignition temperature of approximately 250° C.; and
    a freeze point of approximately −65° C.

11. The method of claim 1, wherein the feedstock comprises one or more oils selected from the group consisting of algae oil, canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, castor oil, and natural oil derivatives of any one or more of these.

12. The method of claim 1, wherein the feedstock comprises soybean oil, a derivative of soybean oil, or combination thereof.

13. A method of producing a jet fuel composition comprising:
    providing a feedstock comprising a natural oil;
    reacting the feedstock with ozone under conditions sufficient to form an ozone-cleaved product; and hydrogenating the ozone-cleaved product under conditions sufficient to form a hydrogenated product comprising a jet fuel composition and at least one byproduct, wherein the hydrogenated product comprises approximately greater than 40 wt % $C_9$ paraffin compounds or approximately greater than 50 wt % $C_{12}$ paraffin prior to any separating of the at least one byproduct from the jet fuel composition.

14. A method of producing a jet fuel composition comprising:

providing a feedstock comprising a natural oil;

reacting the feedstock with oxygen gas under conditions sufficient to form an oxidative-cleaved product; and hydrogenating the oxidative-cleaved product under conditions sufficient to form a hydrogenated product comprising a jet fuel composition and at least one byproduct, wherein the hydrogenated product comprises approximately greater than 40 wt% $C_9$ paraffin compounds or approximately greater than 50 wt% $C_{12}$ paraffin prior to any separating of the at least one byproduct from the jet fuel composition.

* * * * *